United States Patent
Janarthanam et al.

(10) Patent No.: US 8,304,138 B2
(45) Date of Patent: Nov. 6, 2012

(54) FUEL CELL SYSTEM AND METHOD OF USE

(75) Inventors: Suriyaprakash Ayyangar Janarthanam, Westland, MI (US); Victor Dobrin, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/787,619

(22) Filed: May 26, 2010

(65) Prior Publication Data
US 2011/0165499 A1 Jul. 7, 2011

(51) Int. Cl.
*H01M 8/02* (2006.01)
(52) U.S. Cl. .................... 429/513; 429/515
(58) Field of Classification Search .............. 429/444, 429/454, 462, 515, 415, 513
See application file for complete search history.

(56) References Cited

U.S. PATENT DOCUMENTS

| | | |
|---|---|---|
| 5,260,143 A | 11/1993 | Voss et al. |
| 6,093,502 A | 7/2000 | Carlstrom, Jr. et al. |
| 6,809,060 B2 | 10/2004 | Suh et al. |
| 6,864,000 B2 | 3/2005 | Resnick et al. |
| 6,887,610 B2 | 5/2005 | Elhamid et al. |
| 6,939,633 B2 | 9/2005 | Goebel |
| 7,141,324 B2 | 11/2006 | Margiott et al. |
| 7,425,379 B2 | 9/2008 | Joos |
| 2002/0076582 A1 | 6/2002 | Reiser et al. |
| 2002/0102443 A1 | 8/2002 | Yang et al. |
| 2002/0114984 A1* | 8/2002 | Edlund et al. .......... 429/19 |
| 2002/0155336 A1 | 10/2002 | Acker |
| 2003/0235747 A1 | 12/2003 | Haltiner, Jr. et al. |
| 2003/0235752 A1 | 12/2003 | England et al. |
| 2005/0026022 A1 | 2/2005 | Joos |
| 2005/0136302 A1 | 6/2005 | Shoji et al. |
| 2006/0003205 A1 | 1/2006 | Yoshida et al. |
| 2006/0008689 A1 | 1/2006 | Yonekura et al. |
| 2006/0014074 A1 | 1/2006 | Tsuji et al. |
| 2007/0026277 A1 | 2/2007 | Ogawa et al. |
| 2007/0042239 A1 | 2/2007 | Chang et al. |
| 2007/0087233 A1 | 4/2007 | Blaszczyk et al. |
| 2007/0099040 A1 | 5/2007 | Morita et al. |
| 2007/0122664 A1 | 5/2007 | Spare |
| 2007/0154751 A1 | 7/2007 | Katano |
| 2008/0152972 A1 | 6/2008 | Igarashi et al. |
| 2008/0160371 A1* | 7/2008 | Spahr et al. ............ 429/25 |
| 2008/0206610 A1 | 8/2008 | Saunders et al. |
| 2008/0233443 A1 | 9/2008 | Jacobsen et al. |
| 2008/0286613 A1 | 11/2008 | Furukawa |
| 2009/0035630 A1 | 2/2009 | Kumada et al. |

FOREIGN PATENT DOCUMENTS

| | | | |
|---|---|---|---|
| JP | 57145276 A | * | 9/1982 |
| JP | 5258762 A | | 10/1993 |
| JP | 6251788 A | | 9/1994 |
| JP | 2000012062 A | * | 1/2000 |
| JP | 2002093448 A | | 3/2002 |
| JP | 2005026067 A | | 1/2005 |
| JP | 2005116353 A | | 4/2005 |

(Continued)

*Primary Examiner* — Gregg Cantelmo
(74) *Attorney, Agent, or Firm* — Damian Porcari; Brooks Kushman P.C.

(57) ABSTRACT

A fuel cell system includes a primary hydrogen source capable of communicating with a fuel cell anode. The system also includes a secondary hydrogen source communicating with the primary hydrogen source. A first valve is positioned downstream of the secondary hydrogen source. The valve allows hydrogen from the secondary source to communicate with hydrogen from the primary source downstream of the valve and upstream of the fuel cell anode.

20 Claims, 5 Drawing Sheets

FOREIGN PATENT DOCUMENTS

| | | | |
|---|---|---|---|
| JP | 2005183042 A | * | 7/2005 |
| JP | 2005228481 A | | 8/2005 |
| JP | 2005293857 A | | 10/2005 |
| JP | 2006286558 A | | 10/2006 |
| JP | 2006351270 A | | 12/2006 |
| JP | 2007149360 A | | 6/2007 |
| JP | 2007305404 A | | 11/2007 |
| WO | 2007107838 A2 | | 9/2007 |

* cited by examiner

FUEL CELL SYSTEM AND METHOD OF USE

BACKGROUND

1. Technical Field

One or more embodiments of the present disclosure relate to a fuel cell system and a method of use.

2. Background Art

In a typical proton exchange membrane (PEM) based fuel cell system, an anode subsystem provides the necessary hydrogen fuel at the pressure, flow, and humidity to a fuel cell stack for necessary power generation.

During the normal operation of the fuel cell system, when a vehicle ignition key is turned on, the chemical reaction at an anode catalyst layer on an anode side of the fuel cell system involves splitting a hydrogen into an electron and proton. The protons permeate through the membrane to the cathode side. On the cathode side of the membrane, oxygen atoms react with the protons to produce water.

During a soak time period between a shutdown of normal operations and a restart of normal operations, some or all of the remaining unreacted hydrogen on the anode side migrates through the membrane and chemically reacts with the oxygen. Over time, depending upon the length of soak, hydrogen depletes in the anode side. Oxygen or air fills in the anode side to replace the lost hydrogen and increases an anode half cell potential. As a consequence of the increasing potential, carbon corrosion occurs in an anode catalyst layer. Carbon corrosion results in the loss of performance of the fuel cell and reduces the life of the fuel cell stack.

In addition, increasing the anode half cell potential destabilizes a ruthenium component of the anode catalyst layer. The ruthenium migrates to the cathode catalyst. The loss of ruthenium on the anode catalyst layer results in less efficient permeation of electrons and reduces the life of the fuel cell stack.

It is desirable to prevent oxygen and air from migrating to the anode side.

SUMMARY

A fuel cell system includes a primary hydrogen source capable of communicating with a fuel cell anode. The system also includes a secondary hydrogen source situated between the primary hydrogen source and the fuel cell anode. A first valve is positioned downstream of the secondary hydrogen source. The valve allows hydrogen output from the secondary source to mix with hydrogen from the primary source downstream of the first valve and upstream of the fuel cell anode.

In another embodiment of the invention, a fuel cell anode system includes a first conduit capable of communicating with a primary hydrogen source. The conduit including an input and output also communicates with an input to a fuel cell anode. The system also includes a second conduit including an input and output communicating with the first conduit. The second conduit is capable of storing hydrogen when the fuel cell is in an operational time period and dispensing hydrogen when the fuel cell anode is a soak time.

A method of remediating a fuel cell anode gas mixture includes the steps of storing hydrogen in a secondary hydrogen source. The second hydrogen source communicates with a primary hydrogen source during a first time period. Hydrogen is provided from the secondary hydrogen source to the fuel cell anode gas mixture during a second time period. The hydrogen from the secondary hydrogen source is combined with the fuel cell anode gas mixture disposed in the primary hydrogen source. The fuel cell anode gas mixture is remediated by combining the hydrogen with the fuel cell anode gas mixture.

DETAILED DESCRIPTION

Reference will now be made in detail to presently preferred compositions, embodiments and methods of the present invention, which constitute the best modes of practicing the invention presently known to the inventors. But, it should be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the operating examples, or where otherwise expressly indicated, all numbers in this description indicating material amounts, reaction conditions, or uses are to be understood as modified by the word "about" in describing the invention's broadest scope. Practice within the numerical limits stated is generally preferred. Also, unless expressly stated to the contrary:

percent and ratio values are by weight;

a material group or class described as suitable or preferred for a given purpose in connection with the invention implies any two or more of these materials may be mixed and be equally suitable or preferred;

constituents described in chemical terms refer to the constituents at the time of addition to any combination specified in the description, and does not preclude chemical interactions among mixture constituents once mixed;

an acronym's first definition or other abbreviation applies to all subsequent uses here of the same abbreviation and mutatis mutandis to normal grammatical variations of the initially defined abbreviation; and unless expressly stated to the contrary, measurement of a property is determined by the same technique as previously or later referenced for the same property.

Figure 1:
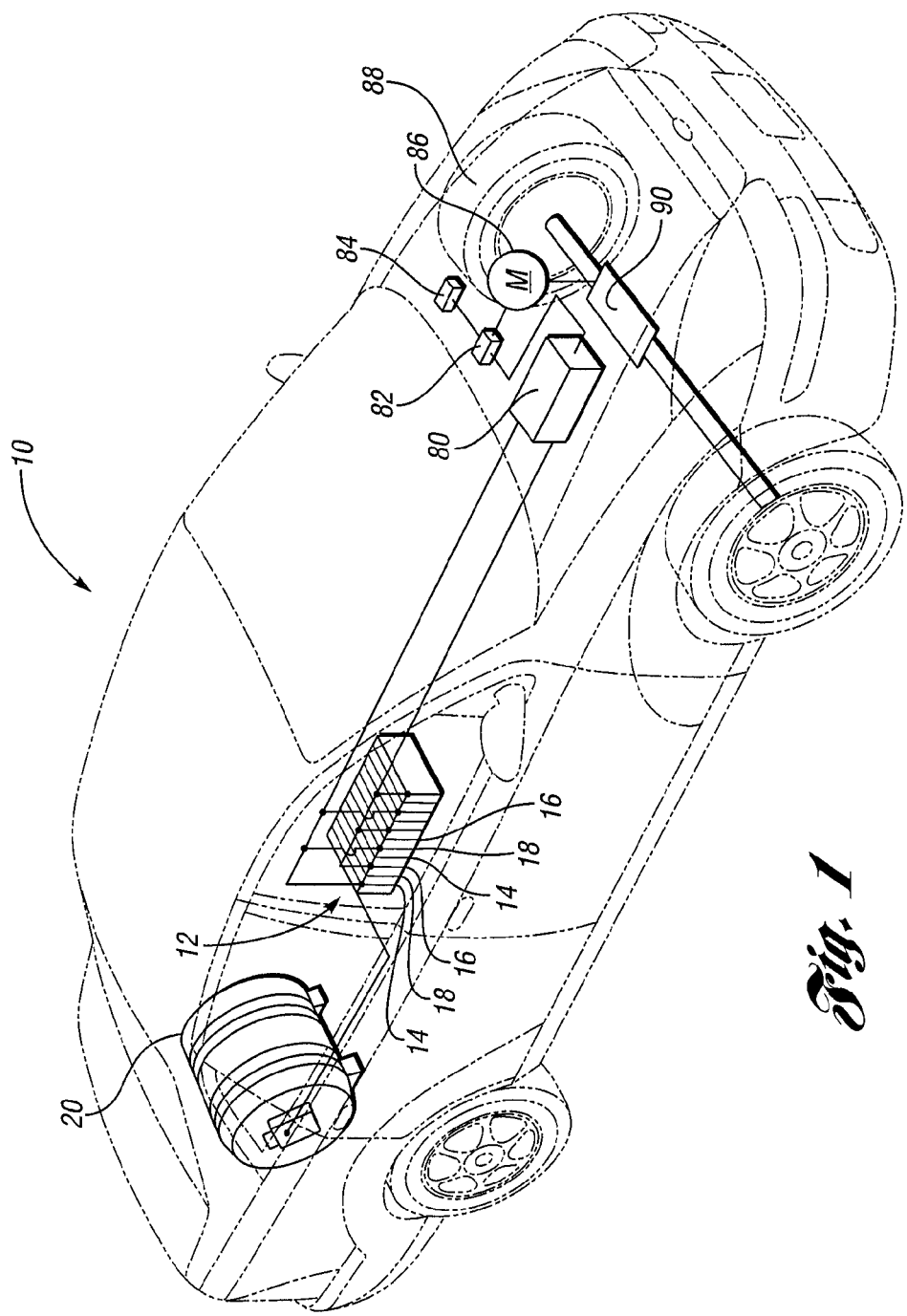
FIG. 1 schematically illustrates a fuel cell system in a vehicle according to at least one embodiment.

Regarding FIG. 1, a vehicle 10 is illustrated with a fuel cell 12 for powering the vehicle 10. While the vehicle 10 shown is a car, it should be understood that the vehicle 10 may also be other forms of transportation such as a truck, off-road vehicle, or an urban vehicle. The fuel cell 12 comprises an anode 14, a cathode 16, and a membrane 18 therebetween.

Fuel cell 12 electrically communicates with and provides energy to a high voltage bus 80. High voltage bus 80 electrically communicates with and provides energy to a d.c.-to-d.c. converter 82. The c.d.-to-d.c. converter 82 electrically communicates with both a battery 84 and a traction motor 86. The traction motor 86 is connected to a wheel 88 connected to the vehicle's 10 frame 90.

Further, while the fuel cell 12 is illustrated as supplying power for the traction motor 86, the fuel cell 12 may be used to power other aspects of the vehicle 10 without departing from the spirit or scope of the invention.

Connected directly or indirectly to the fuel cell 12 is a primary fuel source 20, such as a primary hydrogen source. Non-limiting examples of the primary hydrogen source is a high-pressure hydrogen storage tank or a hydride storage device.

Figure 2:
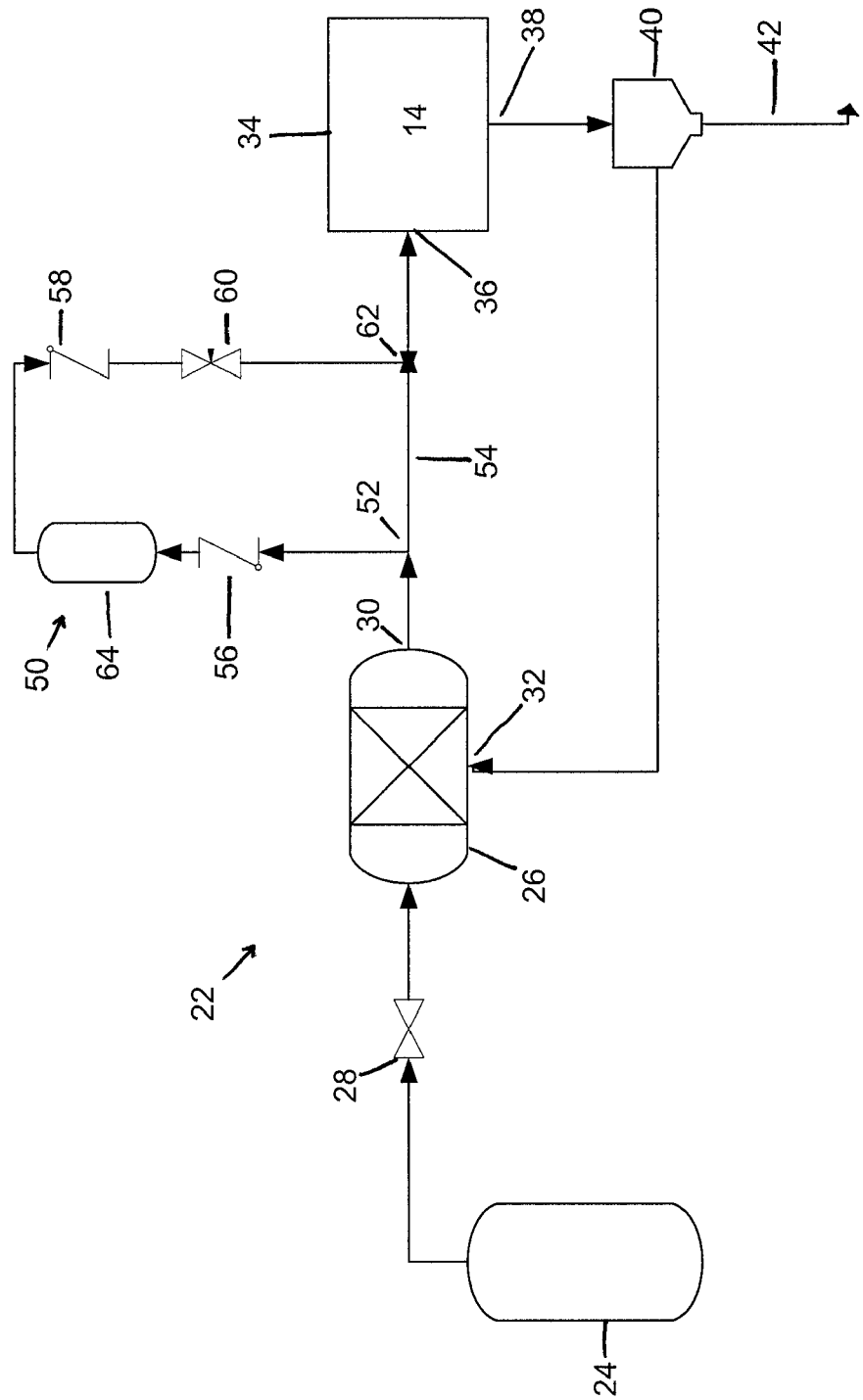
FIG. 2 schematically illustrates a flow diagram of a fuel cell system according to at least one embodiment.

Regarding FIG. 2, a fuel cell system 22 is schematically illustrated as a process flow diagram according to at least one embodiment. A high-pressure hydrogen storage tank 24 connects to a mixing chamber 26 with a system isolation valve 28 disposed therebetween. The mixing chamber 26 has an output 30 and input 32. The output 30 is connected to the fuel cell anode 34 at an input 36. An output 38 of the fuel cell anode 34 is connected directly or indirectly with an optional water knock-out device 40. The water knock-out device 40 is connected directly or indirectly to the mixing chamber input 32 in order to supply an anhydrous anode gas mixture. The water knock-out device 40 is also connected to a vent 42 to an atmosphere external to the fuel cell system 22.

Between the mixing chamber output 30 and the fuel cell input 36, a secondary hydrogen source 50 is positioned. The secondary hydrogen source 50 is connected to an input 52 of the secondary hydrogen source 50, either directly or indirectly. The input 52 is connected, either directly or indirectly, to a pipe 54 connecting the mixing chamber output 30 and the fuel cell input 36. Between the secondary hydrogen source 50 and the input 52 is a check valve 56. The secondary hydrogen source 50 is further connected to another check valve 58 which is further connected to a pin valve 60 positioned between the check valve 58 and an output 62 of the secondary hydrogen source 50. The output 62 is connected to the pipe 54.

In at least one embodiment, the secondary hydrogen source 50 comprises a loop. It should be understood that in another embodiment, the secondary hydrogen source 50 may also comprise a source where the input 52 and the output 62 are the same. The secondary hydrogen source 50 may further include an optional hydrogen storage tank 64 positioned between check valve 56 and either check valve 58 or pin valve 60.

In at least one embodiment, a flow of gas enters the secondary hydrogen source 50 at the input 52. The gas flows downstream towards the output 62. In at least one embodiment, the check valve 56 allows flow only is the direction through to the secondary hydrogen source 50 from the input 52 to the output 62.

In at least one embodiment, a flow of gas exits the secondary hydrogen source 50 at the output 58. The gas flows downstream from the input 52 to the output 62. In at least one embodiment, the check valve 58 allows flow only in the exiting direction from the secondary hydrogen source 50 to the output 62.

In at least one embodiment, the pin valve 60 is a leaky pin valve allowing hydrogen to seep past the valve despite being nominally closed. The quantity that can leak, in at least one embodiment, may be effective to increase the partial pressure of hydrogen in the fuel cell anode 14 to an operational partial pressure of hydrogen.

In another embodiment, the quantity of the leak may be effective to prevent oxygen from crossing the membrane 18 into the anode 14 from the cathode 16. In yet another embodiment, the quantity of the leak may be effective to dilute the oxygen partial pressure sufficiently such that the oxygen causes substantially no corrosion to the anode 14 components.

In at least one embodiment, a pressure of the secondary hydrogen source 50 is equal to or greater than a pressure of the primary fuel source 20. In another embodiment, the pressure of the secondary hydrogen source 50 is positively pressurized relative to the pressure of the primary fuel source 20.

While check valves 52 and 58 are illustrated as check valves, it should be understood that the valves may be any valves known in the art suitable for isolating a flow of gas from one side of the valve to the other. Non-limiting examples of such valves may include a gate valve, a powered valve, a ball valve, a pin valve or a plug valve.

While input 52 is illustrated, in at least one embodiment, as being upstream of output 58, it should be understood that output 58 may be positioned upstream of input 52 without departing from the scope or spirit of the invention.

Figure 3:
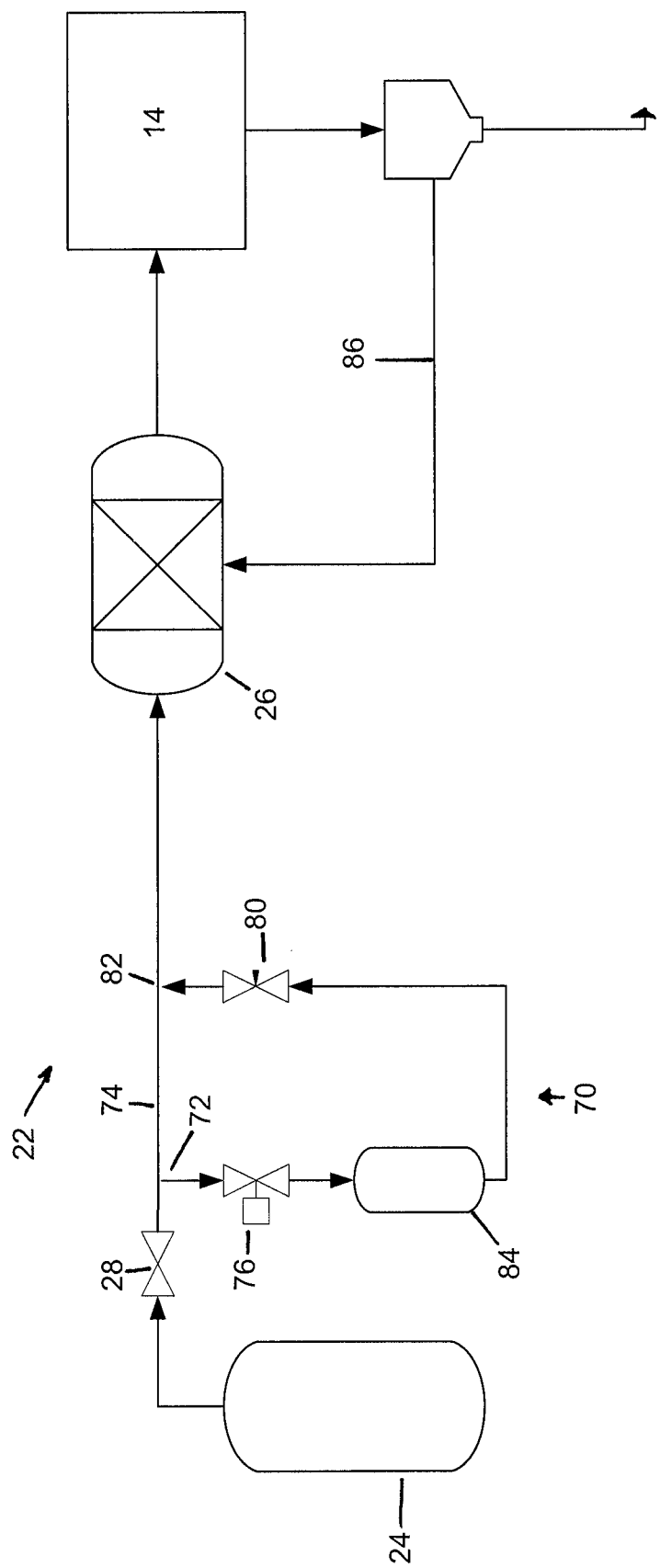
FIG. 3 schematically illustrates a flow diagram of a fuel cell system according to at least one embodiment.
Figure 4:
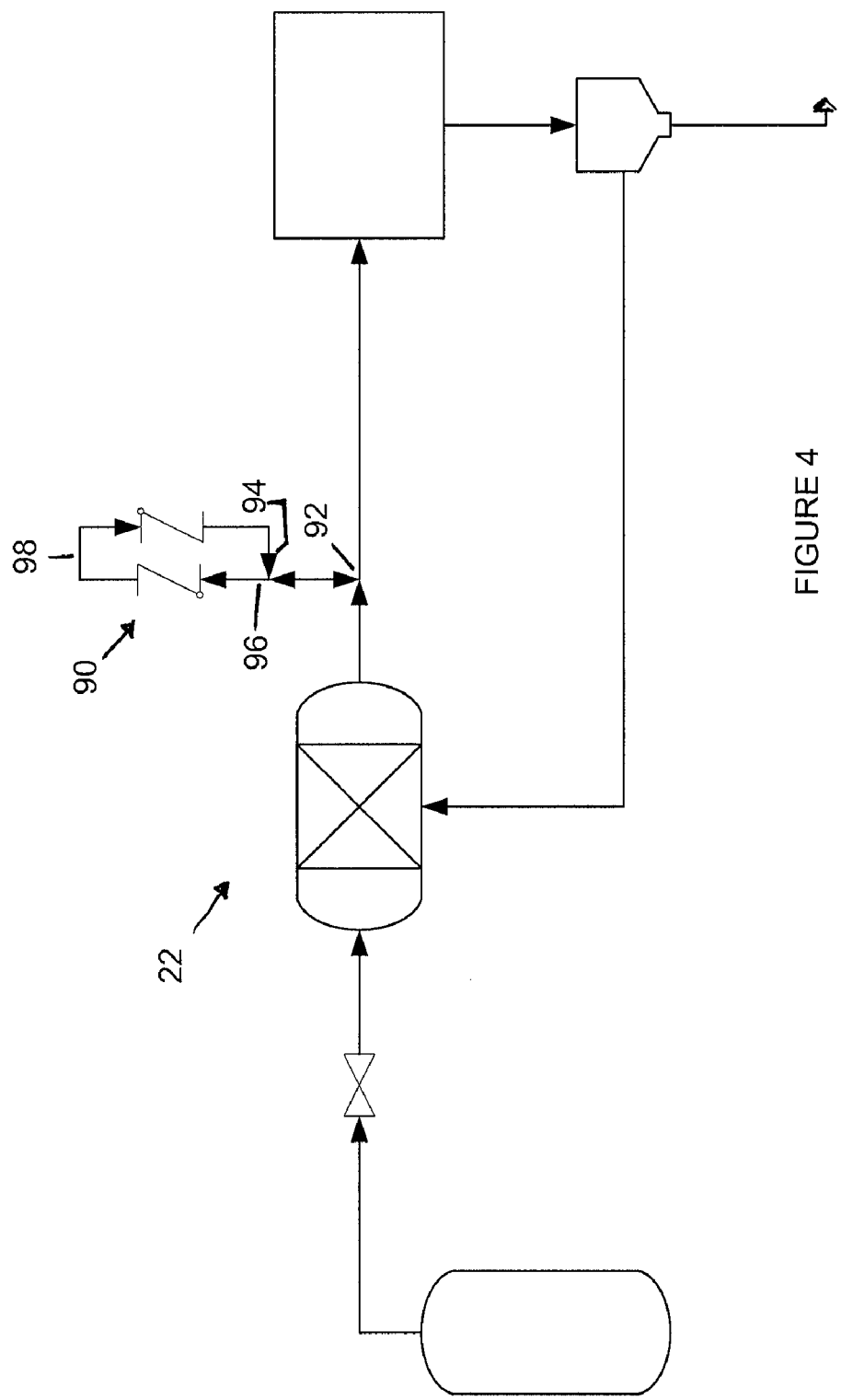
FIG. 4 is a flow diagram of a fuel cell system according to at least one embodiment.

Turning now to FIGS. 3 and 4, a fuel cell system 22 is schematically illustrated as a process flow diagram according to at least one embodiment of the present invention. A high-pressure hydrogen storage tank 24 connects to a mixing chamber 26 with a system isolation valve 28 disposed therebetween.

Between the system isolation valve 28 and the mix chamber 26, a secondary hydrogen source 70 is positioned. The secondary hydrogen source 70 includes an input 72. The input 72 is connected, either directly or indirectly, to a pipe 74 connecting the system isolation valve 28 and the mix chamber 26. Between the secondary hydrogen source 70 and the input 52 is a fill enable valve, such as motorized valve 76. The secondary hydrogen source 70 is further connected to a pin valve 80 positioned between the motorized valve 76 and an output 82 of the secondary hydrogen source 70. The output 82 is connected to the pipe 74.

In at least this embodiment, the secondary hydrogen source 70 comprises a loop. The secondary hydrogen source 70 may further include an optional hydrogen storage tank 84 positioned between motorized valve 76 and either pin valve 80.

It should be understood that the secondary hydrogen source 70, in certain embodiments, can be positioned at any point of the system where the primary fuel flows and/or the anode gas mixture has direct or indirect communication with the fuel cell anode 34. Such positionings do not exceed the scope or spirit of the invention. Non-limiting examples of alternative positionings of the secondary hydrogen source 70 may include in a recirculation loop 86, including a configuration where the input 52 is positioned on one arm of the recirculation loop 86 and the output 62 is positioned on one or more portions of another arm of the recirculation loop 86, the fuel cell anode 34, or the mixing chamber 26. In a similar manner, input 73 may be positioned upstream of the system isolation valve 28 while the output 82 is positioned downstream of the system isolation valve 28.

It should also be understood that there may be a plurality of secondary hydrogen sources 50, 70, and/or 90 connected directly or indirectly to the fuel cell anode 14 system. There may be secondary hydrogen sources 50, 70, and/or 90 connected to other secondary hydrogen sources 50, 70, and/or 90.

In yet another embodiment, as schematically illustrated in FIG. 4, the secondary hydrogen source 90 may include a common access port 92 connected to the fuel cell system 22. For example, the output 94 may be connected to the input 96. The secondary hydrogen source 90 may further include a storage zone 98, such as a length or a coil of a conduit, such as piping.

During an operational time period, hydrogen flows from the primary fuel source 20. The fuel cell anode 14 generates electrons that cross the membrane 18 by methods known in the art.

Figure 5:
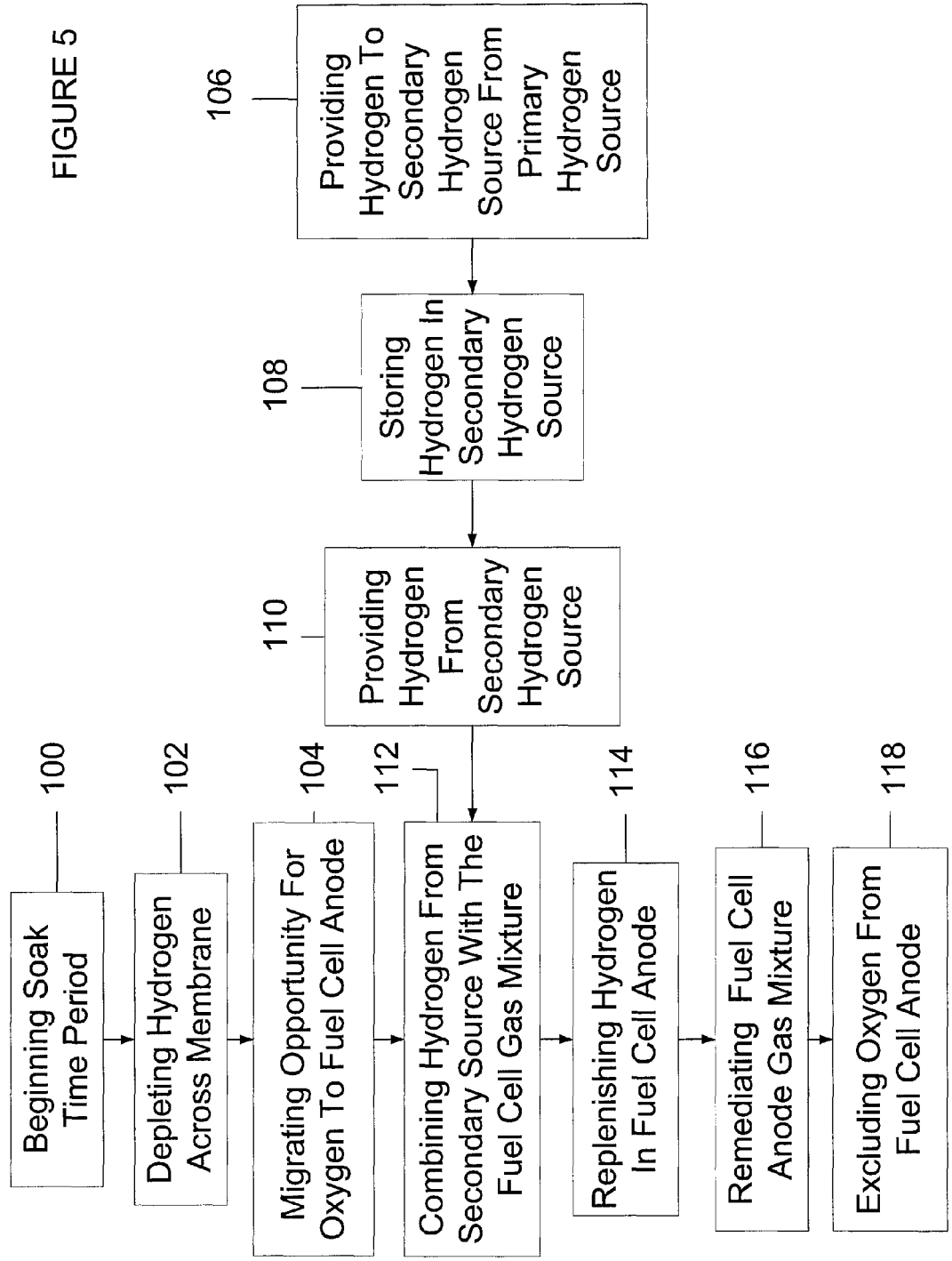
FIG. 5 diagrammatically illustrates a method of use of a fuel cell system according to at least one embodiment.

Turning now to FIG. 5, beginning the non-operational time period for the fuel cell system 22 known as a soak time period 100, hydrogen in the fuel cell anode 14 continues to migrate through the membrane 18 in step 102. The reduced partial pressure of hydrogen that may result on the fuel cell anode 14 side provides an opportunity step 104 for oxygen or air to migrate to the fuel cell anode 14 side of the membrane 18, Hydrogen from the secondary hydrogen sources 50, 70 and/or 90 is released directly or indirectly to the fuel cell anode 14.

In a method physically separate and temporally separate from the above steps 100-104, during the operational time period, the primary hydrogen source is providing, in step 106, hydrogen to the secondary hydrogen source 50, 70, and/or 90. In a storing step 108, the hydrogen is stored in the secondary hydrogen source 50, 70, and/or 90. The hydrogen is provided, in step 110, from the secondary hydrogen source 50, 70, and/or 90 to the anode gas mixture possibly containing some partial pressure of oxygen, and optionally being anhydrous, as well as having a partial pressure of hydrogen originating from the primary hydrogen source.

In at least one embodiment, the partial pressure of oxygen may range from 0.01 wt. % of the anhydrous fuel anode gas mixture to 10 wt. % of the anhydrous fuel anode gas mixture. In another embodiment, the partial pressure of oxygen may range from 0.05 wt. % of the anhydrous fuel anode gas mixture to 5 wt. % of the anhydrous fuel anode gas mixture. In yet another embodiment, the partial pressure of oxygen may range from 0.1 wt. % of the anhydrous fuel anode gas mixture to 1 wt. % of the anhydrous fuel anode gas mixture.

In step 112, the hydrogen provided in step 110 is directly or indirectly combined with the fuel cell anode gas mixture. In the replenishing step 114, the combined gases of step 112 replenishes the hydrogen in the fuel cell anode 14, increasing the hydrogen partial pressure in the fuel cell anode 14. The increased hydrogen partial pressure remediates the fuel cell gas mixture in step 116 by reversing the flow of oxygen back across the membrane 18 into the cathode 16 and/or preventing the flow of oxygen from the cathode 16 across the membrane 18 as in step 118.

Maintaining a positive hydrogen partial pressure or avoiding a partial vacuum pressure using embodiments of the invention remediates the conditions effective to cause oxygen migration across the membrane 18 into the fuel cell anode 14 and/or may also remediate conditions where oxygen has passed through the membrane 18 into the fuel cell anode 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fuel cell system for use in controlling the amount of oxygen or air migrating to a fuel cell anode, the fuel cell anode having an input and an output, the system including a gaseous composition of at least one of hydrogen, an anhydrous anode gas mixture from the anode output, or a blend thereof, the system comprising:
    a primary hydrogen source capable of providing hydrogen to the input to the fuel cell anode;
    a secondary hydrogen source having an input and an output, the secondary hydrogen source being situated between the primary hydrogen source and the fuel cell anode, the secondary hydrogen source being capable of selectably receiving hydrogen; and
    a first valve downstream of the secondary hydrogen source output and communicating with the primary hydrogen source, the valve being capable of directing the hydrogen from the secondary hydrogen source to either the fuel cell anode input or the gaseous composition and subsequently to the fuel cell anode input.

2. The system of claim 1, further comprising a second valve disposed upstream of the input of the secondary hydrogen source and downstream from the primary hydrogen source, the second valve being capable of selectably directing hydrogen to the second hydrogen source.

3. The system of claim 1, further comprising a system isolation valve disposed between the primary hydrogen source and the input to the fuel cell anode.

4. The system of claim 3, wherein the system isolation valve is disposed between the primary hydrogen source and the input to the secondary hydrogen source.

5. The system of claim 2, further comprising a third valve downstream of the secondary hydrogen source.

6. The system of claim 1, further comprising a second valve disposed upstream of the first valve, the first valve is capable of directing hydrogen from the secondary hydrogen source to the anode fuel cell input during a soak period.

7. The system of claim 1, further comprising a mixing chamber and a second valve being disposed upstream of the mixing chamber and downstream of the primary hydrogen source, the mixing chamber being disposed upstream of the first valve and fluidly communication with the fuel cell anode output, the first valve is capable of directing hydrogen from the secondary hydrogen source to the anode fuel cell input or to the gaseous composition and subsequently to the fuel cell anode input during a soak period.

8. The system of claim 1, wherein the gaseous composition includes the anhydrous anode gas mixture having oxygen present in an amount ranging from 0.01 wt % of the anhydrous anode gas mixture to 10 wt % of the anhydrous anode gas mixture.

9. The system of claim 1, wherein the secondary hydrogen source includes a storage zone.

10. The system of claim 1, wherein the secondary hydrogen source includes a storage tank.

11. The system of claim 1, wherein the first valve fluidly communicates with the fuel cell anode output.

12. A fuel cell system for use in controlling the amount of oxygen or air migrating to a fuel cell anode, the fuel cell anode having an input and an output, the system including a gaseous composition of at least one of hydrogen, an anhydrous anode gas mixture from the anode output, or a blend thereof, the system comprising:
    a primary hydrogen source fluidly communicating with the fuel cell anode input;
    a secondary hydrogen source having an input and an output, the output fluidly communicating with the fuel cell anode input, and the secondary hydrogen source input communicating with the primary hydrogen source; and
    a first valve disposed downstream of the secondary hydrogen source output and communicating with the primary hydrogen source and the fuel cell anode input.

13. The system of claim 12, wherein the secondary hydrogen source input fluidly communicates with the fuel cell anode output.

14. The system of claim 13, further comprising a second valve disposed upstream of the secondary hydrogen source and downstream of the primary hydrogen source, the second valve having an open configuration and a closed configuration, the second valve, when in a closed configuration, preventing the primary hydrogen source fluidly communicating with the fuel cell anode output.

15. The system of claim 14, wherein the second valve is a system isolation valve in a closed configuration during a soak time period of the fuel cell anode.

16. The system of claim 14, further comprising a second valve disposed upstream of the secondary hydrogen source input and downstream from the primary hydrogen source, the second valve being capable of selectably directing hydrogen from the primary source to the secondary hydrogen source.

17. A fuel cell system for use in controlling an amount of oxygen or air migrating to a fuel cell anode, the fuel cell anode having an input and an output, the system including a gaseous composition of at least one of hydrogen, an anhydrous anode gas mixture from the fuel cell anode output, or a blend thereof, the system comprising:
- a primary hydrogen source connected to the fuel cell anode input;
- a secondary hydrogen source having an input and an output, the secondary hydrogen source output fluidly communicating with the fuel cell anode input, and the secondary hydrogen source input communicating with the primary hydrogen source and the fuel cell anode output; and
- a first valve disposed downstream of the secondary hydrogen source output and communicating with the primary hydrogen source and the fuel cell anode input.

18. The system of claim 17, further comprising a second valve situated downstream of the primary hydrogen source and upstream of the first valve, the second valve having an open configuration and a closed configuration.

19. The system of claim 18, further comprising a mixing chamber situated between the first and second valves.

20. The system of claim 19, wherein the mixing chamber includes hydrogen, when the second valve is in the open configuration, and the anhydrous anode gas mixture.

* * * * *